(12) United States Patent
Walker

(10) Patent No.: US 8,757,651 B1
(45) Date of Patent: Jun. 24, 2014

(54) COLLAPSIBLE MOTORIZED TWO-WHEELED CYCLE SYSTEM

(71) Applicant: Patrick A. Walker, St. Petersburg, FL (US)

(72) Inventor: Patrick A. Walker, St. Petersburg, FL (US)

( * ) Notice: Subject to any disclaimer, the term of this patent is extended or adjusted under 35 U.S.C. 154(b) by 0 days.

(21) Appl. No.: 13/826,805

(22) Filed: Mar. 14, 2013

(51) Int. Cl.
*B62K 15/00* (2006.01)

(52) U.S. Cl.
USPC .......................................... 280/278; 180/219

(58) Field of Classification Search
CPC ........ B62K 15/006; B62K 11/00; B62K 11/02
USPC .................... 280/278, 287; 180/219
See application file for complete search history.

(56) References Cited

U.S. PATENT DOCUMENTS

| | | | | |
|---|---|---|---|---|
| 578,011 | A * | 3/1897 | Girardet | 280/287 |
| 2,359,764 | A * | 10/1944 | Johnson | 74/594.7 |
| 2,705,156 | A * | 3/1955 | Torre | 280/287 |
| 3,572,757 | A | 3/1971 | Camps | |
| 3,710,883 | A | 1/1973 | Rizzo | |
| 3,865,403 | A * | 2/1975 | Majerus | 280/287 |
| 3,979,136 | A * | 9/1976 | Lassiere | 280/278 |
| 4,287,960 | A | 9/1981 | McConnell | |
| 4,433,852 | A * | 2/1984 | Hon | 280/278 |
| 4,448,437 | A | 5/1984 | Montague | |
| 5,076,386 | A | 12/1991 | Ferneding | |
| 5,269,550 | A * | 12/1993 | Hon et al. | 280/278 |
| 5,833,258 | A | 11/1998 | Maestripieri | |
| 6,116,629 | A * | 9/2000 | Koppensteiner | 280/287 |
| 6,431,301 | B1 | 8/2002 | Forbes | |
| 6,979,014 | B2 | 12/2005 | Morita | |
| 7,198,281 | B2 * | 4/2007 | Huang | 280/278 |
| 7,232,143 | B1 * | 6/2007 | Ferguson et al. | 280/278 |
| 2005/0109804 | A1 | 5/2005 | Larsen et al. | |

FOREIGN PATENT DOCUMENTS

JP 2004338489 A * 12/2004 ............. B62K 15/00

* cited by examiner

*Primary Examiner* — Kevin Hurley

(57) ABSTRACT

A collapsible motorized two-wheeled cycle system features a two-wheeled cycle frame. The system features an upper hinge connected to a frame top horizontal member anterior component posterior end and a frame top horizontal member posterior component anterior end. A conical stiffener plug is located on the frame top horizontal member posterior component anterior end for snugly protruding into a conical stiffener plug aperture located on the frame top horizontal member anterior component posterior end. The system features a lower hinge connected to a frame bottom horizontal member anterior end and a frame anterior vertical member lower end. The system features a steering assembly located on a frame top horizontal member anterior end having a handlebar, a front fork, and a front wheel.

4 Claims, 5 Drawing Sheets

SECOND POSITION

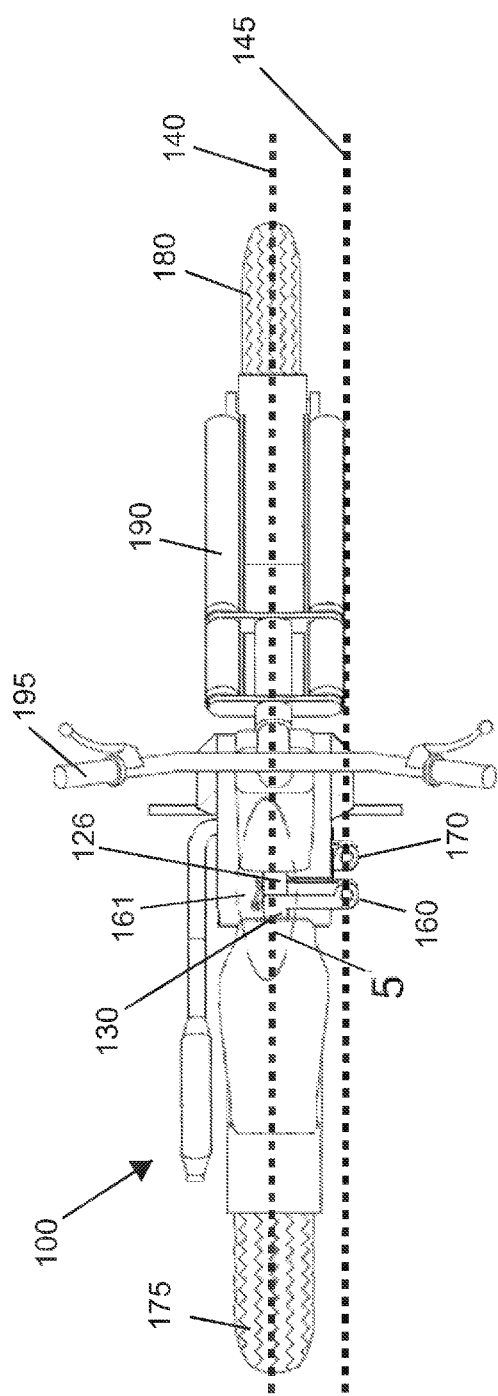
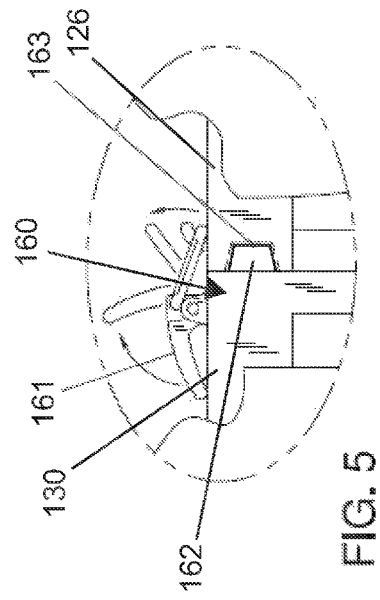

FIRST POSITION

SECOND POSITION

COLLAPSIBLE MOTORIZED TWO-WHEELED CYCLE SYSTEM

FIELD OF THE INVENTION

The present invention relates to collapsible transportation devices, or more specifically, motorized two-wheel personal transportation devices that fold for storage and transport.

BACKGROUND OF THE INVENTION

Bicycles and motor cycles have been used for many decades to provide economical, versatile transportation. Sometimes, the bicycle or motorcycle must be transported to a location before it is used. The present invention features a collapsible motorized two-wheeled cycle system for ease of portability.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a collapsible motorized two-wheeled cycle system for ease of portability. In some embodiments, the system comprises a two-wheeled cycle frame having a frame anterior vertical member, a frame posterior vertical member, a frame top horizontal member, and a frame bottom horizontal member. In some embodiments, the frame anterior vertical member, the frame posterior vertical member, the frame top horizontal member, and the frame bottom horizontal member all lay on a frame plane. In some embodiments, the frame top horizontal member comprises a frame top horizontal member anterior component and a frame top horizontal member posterior component.

In some embodiments, the system comprises an upper hinge located on a frame top horizontal member anterior component posterior end and a frame top horizontal member posterior component anterior end. In some embodiments, an upper lock lever is located close to the upper hinge for securing the frame top horizontal member anterior component to the frame top horizontal member posterior component. In some embodiments, a conical stiffener plug is located on the frame top horizontal member posterior component anterior end for snugly protruding into a conical stiffener plug aperture located on the frame top horizontal member anterior component posterior end.

In some embodiments, the system comprises a lower hinge located between a frame bottom horizontal member anterior end and a frame anterior vertical member lower end. In some embodiments, a lower lock lever is located close to the lower hinge for securing the frame bottom horizontal member to the frame anterior vertical member.

In some embodiments, the system comprises a steering assembly located on a frame top horizontal member anterior end having a handlebar, a front fork, and a front wheel.

BRIEF DESCRIPTION OF THE DRAWINGS

FIG. 3 shows a top view of the present invention.
FIG. 5 shows a close-up view of the upper hinge of the present invention.

DESCRIPTION OF PREFERRED EMBODIMENTS

Figure 1:
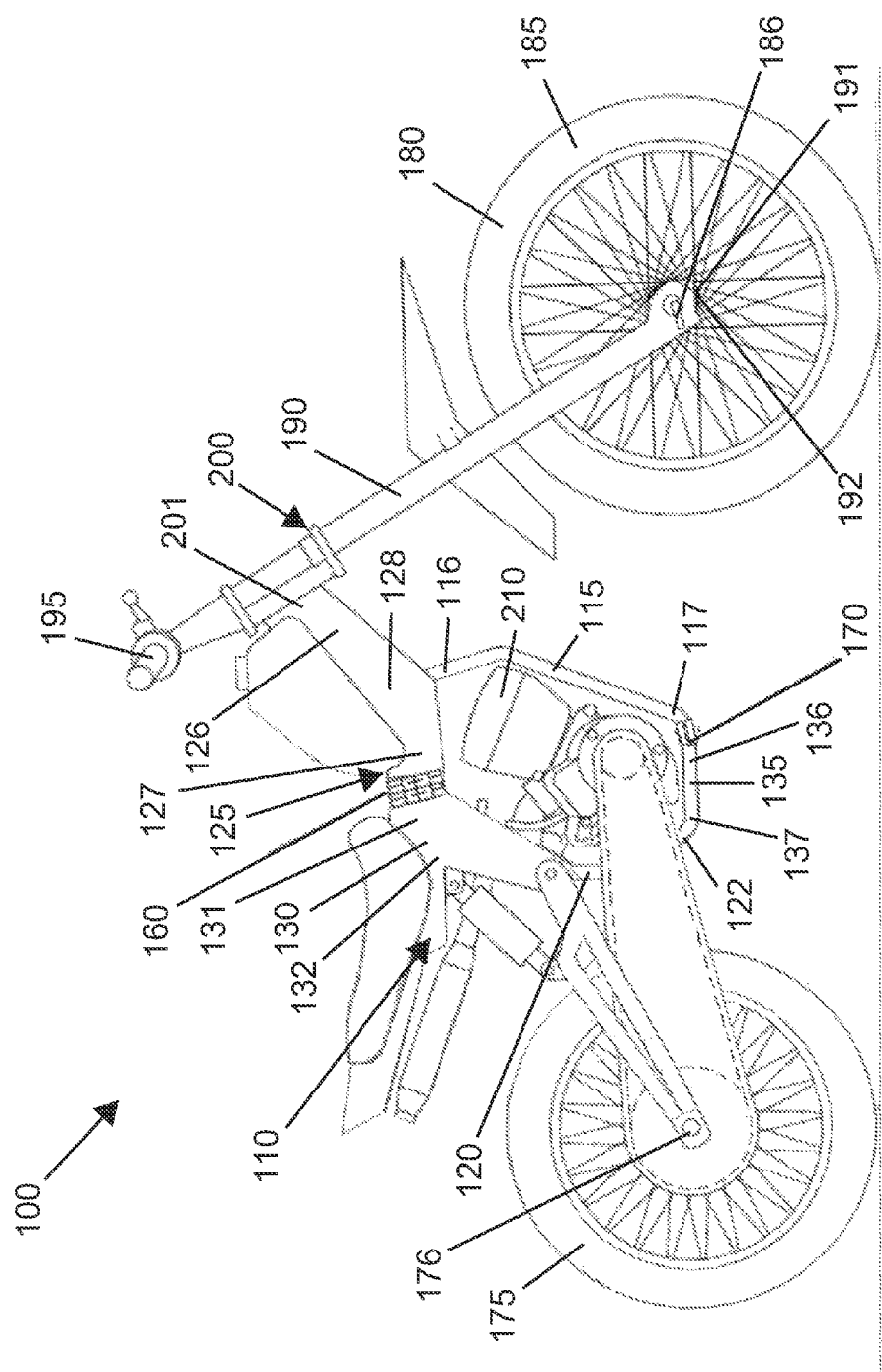
FIG. 1 shows a side view of the present invention.
Figure 2:
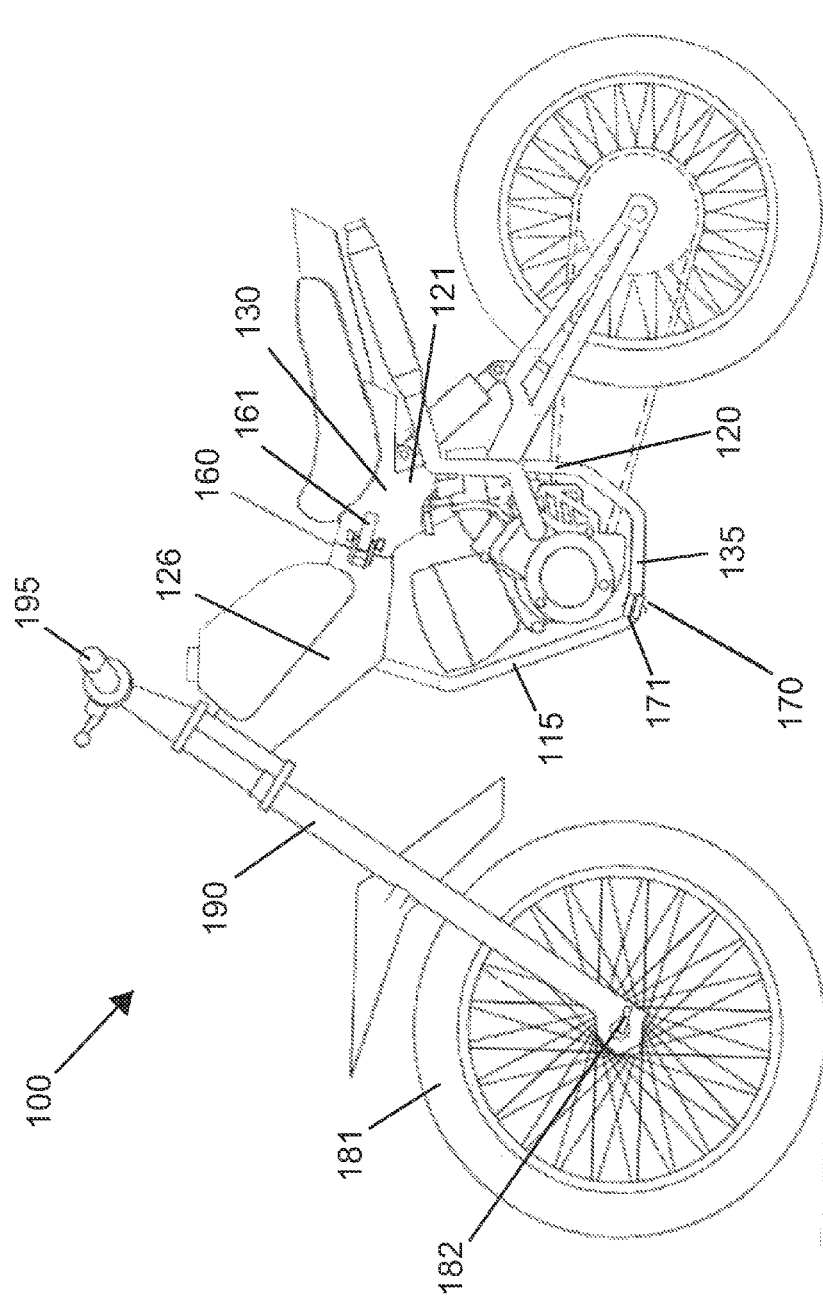
FIG. 2 shows a side view of the present invention.
Figure 4:
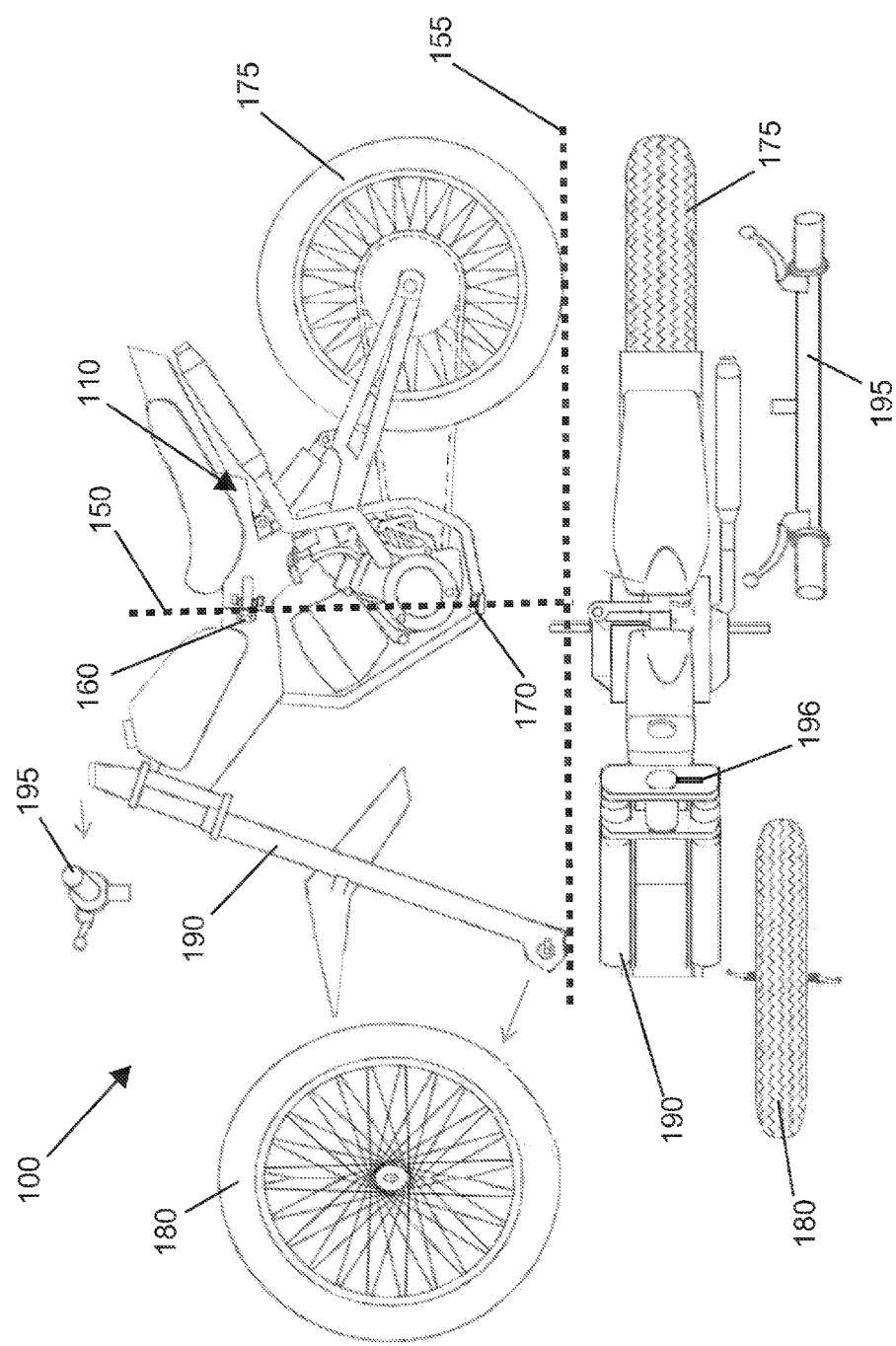
FIG. 4 shows a view of the present invention in a first position.
Figure 6:
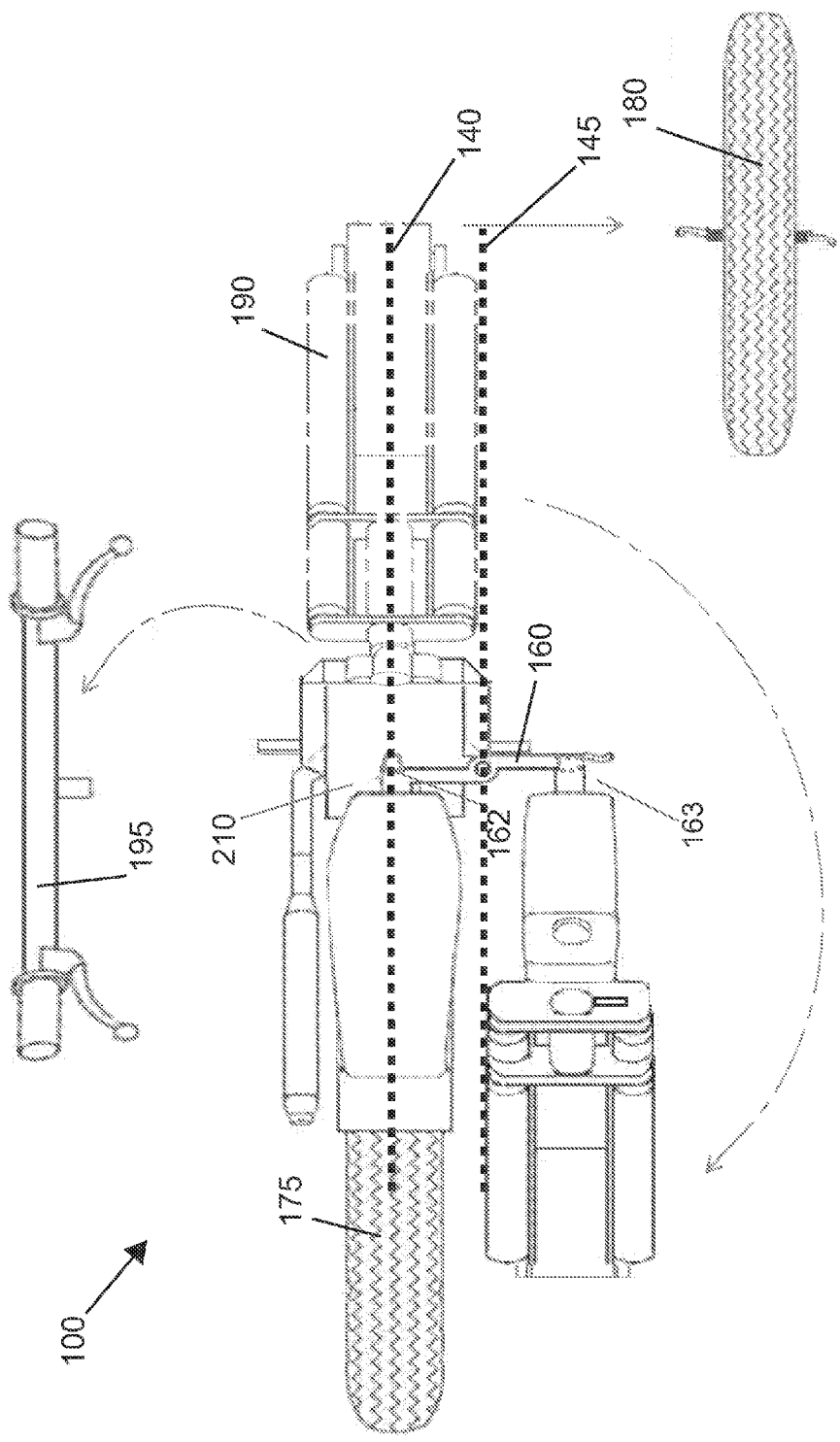
FIG. 6 shows a top view of the present invention in a second position.

Following is a list of elements corresponding to a particular element referred to herein:
100 Collapsible motorized two-wheeled cycle system
110 Two-wheeled cycle frame
115 Frame anterior vertical member
116 Frame anterior vertical member upper end
117 Frame anterior vertical member lower end
120 Frame posterior vertical member
121 Frame posterior vertical member upper end
122 Frame posterior vertical member lower end
125 Frame top horizontal member
126 Frame top horizontal member anterior component
127 Frame top horizontal member anterior component posterior end
128 Frame top horizontal member anterior component middle area
130 Frame top horizontal member posterior component
131 Frame top horizontal member posterior component anterior end
132 Frame top horizontal member posterior component middle area
135 Frame bottom horizontal member
136 Frame bottom horizontal member anterior end
137 Frame bottom horizontal member posterior end
140 Frame plane
145 Hinge pivoting plane
150 Hinge axis
155 Frame axis
160 Upper hinge
161 Upper lock lever
162 Stiffener plug
163 Stiffener plug aperture
170 Lower hinge
171 Lower lock lever
175 Rear wheel
176 Rear wheel centerline
180 Front wheel
181 Front wheel first side
182 First quick release fitting
185 Front wheel second side
186 Second quick release fitting
190 Front fork
191 Front fork anterior most tip
192 Front fork lower most tip
195 Handlebar
196 Handlebar quick release fitting
200 Steering assembly
201 Frame top horizontal member anterior end
210 Motor Referring now to FIG. 1-6, the present invention features a collapsible motorized two-wheeled cycle system (100) for ease of portability and storage for a user. In some embodiments, the system (100) comprises a two-wheeled cycle frame (110) having a frame anterior vertical member (115), a frame posterior vertical member (120), a frame top horizontal member (125), and a frame bottom horizontal member (135).

In some embodiments, the frame anterior vertical member (115) is generally parallel with the frame posterior vertical member (120). In some embodiments, the frame top horizontal member (125) is generally parallel with the frame bottom horizontal member (135). In some embodiments, the frame top horizontal member (125) comprises a general shape of an arc. In some embodiments, the frame anterior vertical member (115), the frame posterior vertical member (120), the frame top horizontal member (125), and the frame bottom horizontal member (135) all lay on a frame plane (140).

In some embodiments, the frame top horizontal member (125) comprises a frame top horizontal member anterior component (126) and a frame top horizontal member posterior component (130). In some embodiments, a frame top horizontal member anterior component posterior end (127) is pivotally attached to a frame top horizontal member posterior component anterior end (131).

In some embodiments, a frame anterior vertical member upper end (116) is disposed on a frame top horizontal member anterior component middle area (128). In some embodiments, a frame posterior vertical member upper end (121) is disposed on a frame top horizontal member posterior component middle area (132).

In some embodiments, a frame bottom horizontal member anterior end (136) is pivotally connected to a frame anterior vertical member lower end (117). In some embodiments, a frame bottom horizontal member posterior end (137) is disposed on a frame posterior vertical member lower end (122).

In some embodiments, the system (100) comprises an upper hinge (160) disposed on the frame top horizontal member anterior component posterior end (127) and the frame top horizontal member posterior component anterior end (131). In some embodiments, the upper hinge (160) comprises an axis of rotation offset from the frame plane (140) on a hinge pivoting plane (145).

In some embodiments, an upper lock lever (161) is disposed proximal to the upper hinge (160) for securing the frame top horizontal member anterior component (126) to the frame top horizontal member posterior component (130).

In some embodiments, a conical stiffener plug (162) is disposed on frame top horizontal member posterior component anterior end (131) for snugly protruding into a conical stiffener plug aperture (163) disposed on the frame top horizontal member anterior component posterior end (127).

In some embodiments, the system (100) comprises a lower hinge (170) disposed between the frame bottom horizontal member anterior end (136) and the frame anterior vertical member lower end (117). In some embodiments, the lower hinge (170) comprises an axis of rotation offset from the frame plane (140) on the hinge pivoting plane (145).

In some embodiments, a lower lock lever (171) is disposed proximal to the lower hinge (170) for securing the frame bottom horizontal member (135) to the frame anterior vertical member (115).

In some embodiments, the upper hinge (160) and the lower hinge (170) comprise pivot points disposed on a hinge axis (150). In some embodiments, the hinge axis (150) is perpendicularly disposed with respect to a frame axis (155). In some embodiments, the frame axis (155) comprises a first point lying at an intersection of a rear wheel (175) and a ground surface and a second point lying at an intersection of a front fork anterior most tip (191) and a front fork lower most tip (192). In some embodiments, the hinge axis (150) lays on the hinge pivoting plane (145).

In some embodiments, the upper hinge (160) and the lower hinge (170) comprise pivot points disposed on a hinge axis (150). In some embodiments, the hinge axis (150) is perpendicularly disposed with respect to a frame axis (155). In some embodiments, the frame axis (155) comprises a first point lying at a rear wheel centerline (176) and a second point lying at an intersection of a front fork anterior most tip (191) and a front fork lower most tip (192). In some embodiments, the hinge axis (150) lays on the hinge pivoting plane (145).

In some embodiments, the system (100) comprises a steering assembly (200) disposed on a frame top horizontal member anterior end (201) having a handlebar (195), a front fork (190), and a front wheel (180).

In some embodiments, in a first position, the upper hinge (160) and the lower hinge (170) are in a closed position. In some embodiments, the frame top horizontal member anterior component (126) and the frame top horizontal member posterior component (130) lay on the frame plane (140). In some embodiments, the frame bottom horizontal member (135) and the frame anterior vertical member (115) lay on the frame plane (140). In some embodiments, the stiffener plug (162) is snugly disposed in the stiffener plug stiffener plug aperture (163).

In some embodiments, in a second position, the upper hinge (180) and the lower hinge (170) are rotated 180 degrees about the hinge axis (150) to an open position. In some embodiments, the frame top horizontal member anterior component (126) and the frame top horizontal member posterior component (130) lay parallel to one another. In some embodiments, the frame bottom horizontal member (135) lays parallel to the frame top horizontal member anterior component (126).

In some embodiments, a motor (210) is disposed on the frame (110).

In some embodiments, the handlebar (195) is removable via a handlebar quick release fitting (196) disposed on the steering assembly (200).

In some embodiments, the front wheel (180) is quickly removable via a first quick release fitting (182) disposed on a front wheel first side (181) and a second wheel quick release fitting (186) disposed on a front wheel second side (185).

In some embodiments, the hinge pivoting plane (145) is offset from the frame plane (140) by 2 inches. In some embodiments, the hinge pivoting plane (145) is offset from the frame plane (140) by 3 inches. In some embodiments, the hinge pivoting plane (145) is offset from the frame plane (140) by 4 inches. In some embodiments, the hinge pivoting plane (145) is offset from the frame plane (140) by 5 inches. In some embodiments, the hinge pivoting plane (145) is offset from the frame plane (140) by 6 inches. In some embodiments, the hinge pivoting plane (145) is offset from the frame plane (140) by 7 inches. In some embodiments, the hinge pivoting plane (145) is offset from the frame plane (140) by 8 inches. In some embodiments, the hinge pivoting plane (145) is offset from the frame plane (140) by more than 8 inches.

As used herein, the term "about" refers to plus or minus 10% of the referenced number.

The disclosures of the following U.S. Patents are incorporated in their entirety by reference herein: U.S. Patent Pub. No. 2005/0109804; U.S. Pat. No. 6,979,014; U.S. Pat. No. 6,431,301; U.S. Pat. No. 5,833,258; U.S. Pat. No. 5,076,388; U.S. Pat. No. 4,448,437; U.S. Pat. No. 4,287,960; U.S. Pat. No. 3,710,883; and U.S. Pat. No. 3,572,757.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures.

The reference numbers recited in the below claims are solely for ease of examination of this patent application, and are exemplary, and are not intended in any way to limit the scope of the claims to the particular features having the corresponding reference numbers in the drawings.

What is claimed is:

1. A collapsible motorized two-wheeled cycle system (100) for ease of portability and storage for a user, wherein the system (100) comprises:
   (a) a two-wheeled cycle frame (110) having a frame anterior vertical member (115), a frame posterior vertical member (120), a frame top horizontal member (125), and a frame bottom horizontal member (135),
   wherein the frame anterior vertical member (115) is generally parallel with the frame posterior vertical member (120),
   wherein the frame top horizontal member (125) is generally parallel with the frame bottom horizontal member (135),
   wherein the frame anterior vertical member (115), the frame posterior vertical member (120), the frame top horizontal member (125), and the frame bottom horizontal member (135) all lay on a frame plane (140),
   wherein the frame top horizontal member (125) comprises a frame top horizontal member anterior component (126) and a frame top horizontal member posterior component (130),
   wherein a frame top horizontal member anterior component posterior end (127) is pivotally attached to a frame top horizontal member posterior component anterior end (131),
   wherein a frame anterior vertical member upper end (116) is disposed on a frame top horizontal member anterior component middle area (128), wherein a frame posterior vertical member upper end (121) is disposed on a frame top horizontal member posterior component middle area (132),
   wherein a frame bottom horizontal member anterior end (136) is pivotally connected to a frame anterior vertical member lower end (117), wherein a frame bottom horizontal member posterior end (137) is disposed on a frame posterior vertical member lower end (122);
   (b) an upper hinge (160) disposed on the frame top horizontal member anterior component posterior end (127) and the frame top horizontal member posterior component anterior end (131), wherein the upper hinge (160) comprises an axis of rotation offset from the frame plane (140) on a hinge pivoting plane (145), wherein the hinge pivoting plane (145) is offset from the frame plane (140) by at least four inches,
   wherein an upper lock lever (181) is disposed proximal to the upper hinge (160) for securing the frame top horizontal member anterior component (126) to the frame top horizontal member posterior component (130),
   wherein a conical stiffener plug (162) is disposed on the frame top horizontal member posterior component anterior end (131) for snugly protruding into a conical stiffener plug aperture (163) disposed on the frame top horizontal member anterior component posterior end (127);
   (c) a lower hinge (170) disposed between the frame bottom horizontal member anterior end (136) and the frame anterior vertical member lower end (117), wherein the lower hinge (170) comprises an axis of rotation offset from the frame plane (140) on the hinge pivoting plane (145),
   wherein a lower lock lever (171) is disposed proximal to the lower hinge (170) for securing the frame bottom horizontal member (135) to the frame anterior vertical member (115),
   wherein the upper hinge (160) and the lower hinge (170) comprise pivot points disposed on a hinge axis (150), wherein the hinge axis (150) is perpendicularly disposed with respect to a frame axis (155), wherein the frame axis (155) comprises a first point lying at an intersection of a rear wheel (175) and a ground surface, and a second point lying at an intersection of a front fork anterior most tip (191) and a front fork lower most tip (192), wherein the hinge axis (150) lays on the hinge pivoting plane (145); and
   (d) a steering assembly (200) disposed on a frame top horizontal member anterior end (201) having a handlebar (195), a front fork (190), and a front wheel (180);
   wherein in a first position, the upper hinge (160) and the lower hinge (170) are in a closed position, wherein the frame top horizontal member anterior component (126) and the frame top horizontal member posterior component (130) lay on the frame plane (140), wherein the frame bottom horizontal member (135) and the frame anterior vertical member (115) lay on the frame plane (140), wherein the stiffener plug (162) is snugly disposed in the stiffener plug stiffener plug aperture (163),
   wherein in a second position, the upper hinge (160) and the lower hinge (170) are rotated 180 degrees about the hinge axis (150) to an open position, wherein the frame top horizontal member anterior component (126) and the frame top horizontal member posterior component (130) lay parallel to one another, wherein the frame bottom horizontal member (135) lays parallel to the frame top horizontal member anterior component (126).

2. The system (100) of claim 1, wherein a motor (210) is disposed on the frame (110).

3. The system (100) of claim 1, wherein the handlebar (195) is removable via a handlebar quick release fitting (196).

4. The system (100) of claim 1, wherein the front wheel (180) is removable via a first quick release fitting (182) disposed on a front wheel first side (181) and a second wheel quick release fitting (186) disposed on a front wheel second side (185).

* * * * *